United States Patent
Ikeuchi et al.

(10) Patent No.: US 7,561,969 B2
(45) Date of Patent: Jul. 14, 2009

(54) NAVTEX RECEIVER

(75) Inventors: Takumi Ikeuchi, Nishinomiya (JP); Akira Ninomiya, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 341 days.

(21) Appl. No.: 11/341,525

(22) Filed: Jan. 30, 2006

(65) Prior Publication Data

US 2006/0173620 A1 Aug. 3, 2006

(30) Foreign Application Priority Data

Jan. 31, 2005 (JP) ............... 2005-023153

(51) Int. Cl.
*G01C 21/00* (2006.01)

(52) U.S. Cl. .............. 701/225; 701/213; 701/300; 342/357.08

(58) Field of Classification Search .............. 701/213, 701/225, 300
See application file for complete search history.

(56) References Cited

U.S. PATENT DOCUMENTS

| 3,808,598 | A | 4/1974 | Carter | |
|---|---|---|---|---|
| 5,952,959 | A | 9/1999 | Norris | |
| 6,222,484 | B1 * | 4/2001 | Seiple et al. | 342/357.09 |

| 2003/0085841 | A1 | 5/2003 | Spilker et al. |
|---|---|---|---|
| 2003/0156063 | A1 | 8/2003 | Spilker et al. |

FOREIGN PATENT DOCUMENTS

| GB | 2 111 787 A | 7/1983 |
|---|---|---|
| GB | 2 312 112 A | 10/1997 |
| JP | 11-271087 A | 10/1999 |
| WO | WO-2004/057360 A3 | 7/2004 |

OTHER PUBLICATIONS

Furuno Operator's Manual Navtex Receiver NX-300. May 2002. Furuno ELectric Co. H.*

* cited by examiner

*Primary Examiner*—Thomas G Black
*Assistant Examiner*—Shelley Chen
(74) *Attorney, Agent, or Firm*—Birch, Stewart, Kolasch & Birch, LLP (57) ABSTRACT

Upon receiving a NAVTEX broadcast signal, a NAVTEX receiver reconstructs text data, detects a special character string including numerals followed by "N" or "S" and numerals followed by "E" or "W" in this order contained in latitude/longitude information, and extracts the latitude/longitude information from a textual sentence containing this special character string. Using the extracted latitude/longitude information and information on latitude/longitude of the receiver, the NAVTEX receiver calculates the distance and direction from own ship to a geographical site expressed by the extracted latitude/longitude information, and outputs information on at least the calculated distance and the extracted latitude/longitude information.

5 Claims, 7 Drawing Sheets

Fig. 2

- S1: RECONSTRUCT TEXT DATA
- S2: SEARCH FOR SPECIAL CHARACTER STRING
- S3: ANALYZE TEXT DATA PORTION CONTAINING SPECIAL CHARACTERS
- S4: ACQUIRE LAT/LON INFO
- S5: CALCULATE DISTANCE
- S6: OUTPUT LAT/LON INFO AND DISTANCE INFO

NAVTEX RECEIVER

CROSS REFERENCE OF RELATED APPLICATION

Japanese Patent Application Tokugan No. 2005-023153 is hereby incorporated by reference.

BACKGROUND OF THE INVENTION

1. Field of the Invention

The present invention relates to a receiver for receiving marine-related information transmitted by a radio communications system, such as NAVTEX (which stands for Navigational Telex).

2. Description of the Related Art

Today, the Global Marine Distress and Safety System (GMDSS) plays an important role as a communications system used in relation to distress and safety at sea. The GMDSS makes use of satellite communications and digital communications technologies to enable sea-going ships in any areas to quickly obtain maritime safety information and meteorological information provided from coastal stations by automatic reception. For example, when a ship is in distress at sea, the GMDSS can be used to request search and rescue organizations and nearby ships to promptly initiate search and rescue operation in a reliable fashion regardless of in which area the ship in distress is currently located. Designated as a vital element of the GMDSS, NAVTEX is a radio communications system for the broadcast and automatic reception of marine-related information provided chiefly to ships navigating within approximately 300 nautical miles from the coast. NAVTEX services include transmission of maritime safety information, such as navigational warnings and meteorological warnings and forecasts, in the from of English or Japanese text data, for example, as well as automatic reception of each message, which will be printed or displayed on-screen by NAVTEX receivers installed on-board ships in a service area. Conventionally, most NAVTEX receivers are designed to sequentially print out messages which have been obtained by receiving and demodulating NAVTEX signals on a strip of paper. Since the NAVTEX signals only include information on navigational, meteorological, distress and other safety-related events within a service area and on latitude and longitude at which each event has taken place in the from of text data, however, it is not so easy to acquire and utilize such information that is needed for navigational purposes by own ship.

Japanese Patent Application Publication No. 1999-271087 discloses a shipborne navigational display system for acquiring and displaying information necessary for navigational purposes of own ship. Incorporating a built-in chart display feature, this system acquires information on an event and latitude/longitude at which the event has taken place from various pieces of information obtained from the GMDSS and displays the site of the event on an on-screen electronic chart.

The conventional NAVTEX receivers sequentially print out individual events together with latitude/longitude information contained in received messages on a strip of paper, for example, as stated above. Thus, if a user wishes to know the distance from own ship to the site of a particular event from the printed information, the user is forced to undertake demanding work of manually calculating the distance from information on latitude/longitude of the receiver and the latitude/longitude information for that event.

While the aforementioned shipborne navigational display system of Japanese Patent Application Publication No. 1999-271087 is advantageous in that individual events are intuitively presented on the electronic chart display based on the latitude/longitude information for the events, the system does not enable the user to directly recognize the distance from own ship to the site of each event. In addition, as this shipborne navigational display system is an integrated system incorporating not only a NAVTEX receiver but other apparatuses, such as a chart display device, the system is large in size and requires complicated operation and control.

SUMMARY OF THE INVENTION

In light of the foregoing, it is an object of the invention to provide a receiver, such as a NAVTEX receiver, which can determine and output the distance from own ship to the site of an event concerned with a simple configuration.

In one principal form of the invention, a receiver includes a broadcast signal demodulator for receiving and demodulating a broadcast signal, and an information extractor for extracting some information from the demodulated broadcast signal. The information extractor includes a latitude/longitude information detector for detecting latitude/longitude information contained in the aforementioned particular information, and a calculator for calculating a distance based on the detected latitude/longitude information and information on latitude/longitude of the receiver.

The receiver thus configured can acquire the latitude/longitude information for an event contained in the information extracted from the received broadcast signal, and calculate the distance from own ship to a geographical site where the event is occurring (or has occurred) from the detected latitude/longitude information and the information on latitude/longitude of the receiver. The distance from own ship to the geographical site of the event is output to a display section or a printer of the receiver to notify a user of the distance to the event concerned.

In another principal form of the invention, a receiver includes a broadcast signal demodulator for receiving and demodulating a broadcast signal containing marine-related information, an information extractor for extracting the marine-related information from the demodulated broadcast signal, and an image former for forming an image indicating the extracted marine-related information. The information extractor includes a latitude/longitude information detector for detecting latitude/longitude information contained in the marine-related information, and a calculator for calculating a distance based on the detected latitude/longitude information and information on latitude/longitude of the receiver, wherein the information extractor outputs the calculated distance to the image former.

The marine-related information may include information on navigational, meteorological, distress and other safety-related events whatsoever occurring within a service area of a transmitting station. This kind of event information is associated with information on the location, or latitude/longitude, of each event.

The receiver configured as mentioned above can acquire the latitude/longitude information for an event contained in the marine-related information extracted from the received broadcast signal, and calculate the distance from own ship to a geographical site where the event is occurring (or has occurred) from the detected latitude/longitude information and the information on latitude/longitude of the receiver. The distance from own ship to the geographical site of the event is output to a display section or a printer of the receiver to notify the user of the distance to the event concerned.

It will be appreciated from above that the invention provides a receiver which can determine and output the distance from own ship to the site of an event concerned with almost the same simple configuration as that of conventional receivers.

In one feature of the invention, the latitude/longitude information detector of the receiver includes a special character string extractor for extracting a special character string indicating latitude/longitude from the marine-related information. Specifically, the special character string extractor searches for a character string including numerals followed by "N" or "S" and numerals followed by "E" or "W" in this order contained in the marine-related information and extracts the character string thus formatted as the latitude/longitude information.

The latitude/longitude information transmitted in an English language NAVTEX broadcast, for example, typically contains a character string including numerals followed by "N" and numerals followed by "E", or numerals followed by "S" and numerals followed by "W", such as "45.12 N 123.45 E" or "45.12 S 123.45 W". The aforementioned special character string extractor searches for this kind of special character string through text data of the marine-related information. When such a special character string is found in the text data, the special character string extractor analyzes a specific portion (e.g., a sentence) of the text data containing the special character string and acquires the latitude/longitude information.

According to this feature of the invention, it is possible to configure a receiver which can easily acquire latitude/longitude information for each event by detecting a character string including special characters characteristic of the latitude/longitude information contained in marine-related information.

In another feature of the invention, the information extractor of the receiver selects from distances calculated by using multiple items of detected latitude/longitude information only such distances that satisfy predetermined conditions and outputs the selected distances and the latitude/longitude information corresponding thereto to the image former.

When the marine-related information contains latitude/longitude information for multiple events of the same kind, the information extractor of the receiver thus configured can acquire the latitude/longitude information for these events and calculate the distances from own ship to the geographical sites of the individual events. Then, among all the distances calculated, the information extractor extracts such distances that satisfy the predetermined conditions (e.g., the distances of a specified number of events nearest own ship) and the corresponding latitude/longitude information.

In still another feature of the invention, the information extractor of the receiver extracts event information corresponding to each distance satisfying the aforementioned predetermined conditions and outputs the event information to the image former.

The latitude/longitude information is always preceded by or followed by information on some kind of event. The information extractor of the receiver thus configured can acquire the event information by analyzing a specific portion (e.g., a sentence) of the text data containing the latitude/longitude information.

According to this feature of the invention, it is possible to configure a receiver which can easily acquire the distances from own ship to the geographical sites of the individual events satisfying the user-specified conditions.

In yet another feature of the invention, the information extractor of the receiver extracts event information for individual items of detected latitude/longitude information, classifies multiple items of extracted event information into different kinds of event information, selects from distances calculated by using multiple items of detected latitude/longitude information only such distances that satisfy predetermined conditions for each kind of classified event information, and outputs the selected distances and the event information to the image former.

In the receiver thus configured, the information extractor extracts multiple items of latitude/longitude information and the event information corresponding thereto contained in the marine-related information and classifies the multiple items of extracted event information. Then, the information extractor selects the distances satisfying the predetermined conditions for each kind of classified event information and outputs the selected distances and the event information together with the corresponding latitude/longitude information.

According to this feature of the invention, the multiple items of extracted event information are classified by the kind of event information. Thus, the invention makes it possible to configure a receiver which can easily acquire the distances from own ship to the geographical sites of the individual events satisfying the user-specified conditions for each kind of classified event information.

These and other objects, features and advantages of the invention will become more apparent upon reading the following detailed description along with the accompanying drawings.

DETAILED DESCRIPTION OF THE PREFERRED EMBODIMENTS OF THE INVENTION

First Embodiment

A receiver according to a first embodiment of the invention is now described referring to FIGS. 1, 2, 3A and 3B. The invention is hereinafter described, by way of example, with reference to a NAVTEX receiver which obtains marine-related information from NAVTEX signals received. NAVTEX services include broadcasts on a frequency of 518 kHz which is common throughout the world (International NAVTEX service) made in English and localized broadcasts on 490 kHz or 4209.5 kHz (National NAVTEX services) made in national languages, such as Japanese. For ships navigating in coastal areas of Japan, additional Japanese language NAVTEX broadcasts are provided on a locally assigned frequency of 424 kHz. In the following discussion, individual items of information, such as meteorological information including low or high atmospheric pressures or a stationary front or distress information, contained in NAVTEX broadcast signals are referred to as "events."

Figure 1:
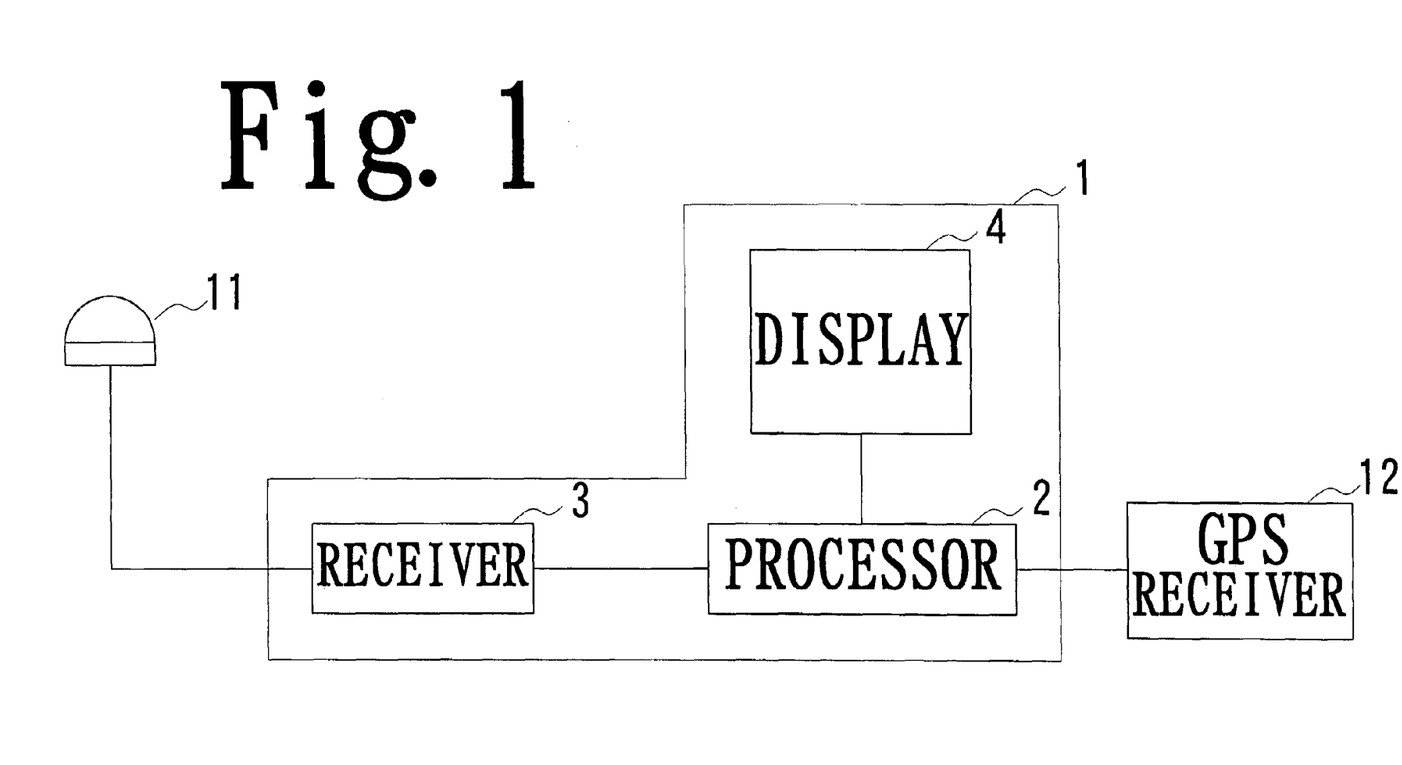
FIG. 1 is a block diagram schematically showing the configuration of a NAVTEX receiver according to a first embodiment of the invention.
Figure 2:
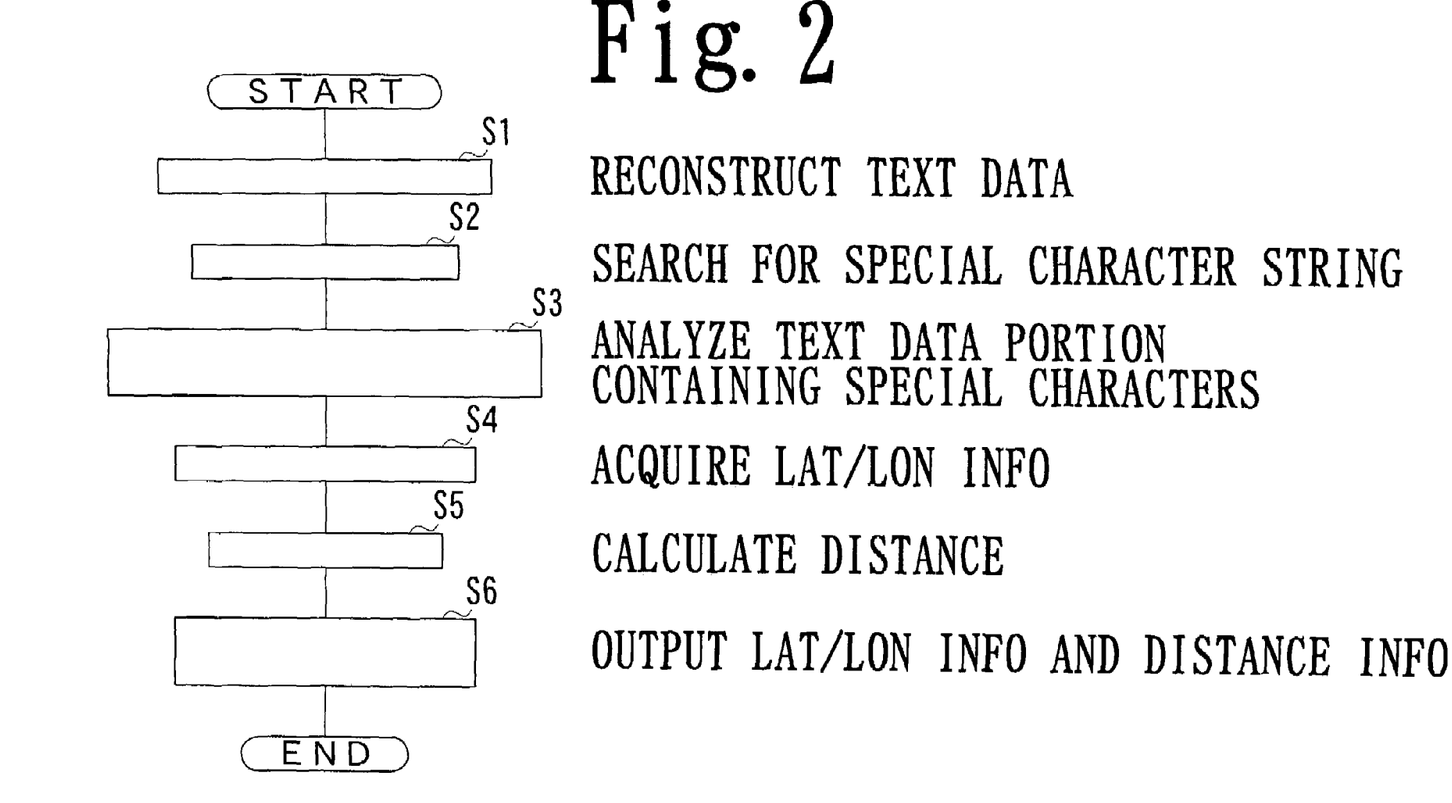
FIG. 2 is a flowchart showing a flow of operations performed by a processing section of the NAVTEX receiver of FIG. 1.

FIG. 1 is a block diagram schematically showing the configuration of a NAVTEX receiver 1 of the first embodiment, and FIG. 2 is a flowchart showing a flow of operations performed by a processing section 2 of the NAVTEX receiver of FIG. 1.

As shown in FIG. 1, the NAVTEX receiver 1 of the first embodiment includes in addition to the aforementioned processing section 2 a receive section 3 and a display section 4. The processing section 2 of the NAVTEX receiver 1 is connected to the receive section 3 and the display section 4 as well as to an external Global Positioning System (GPS) receiver 12, and the receive section 3 of the NAVTEX receiver 1 is connected to an antenna 11.

The antenna 11 receives a NAVTEX broadcast signal and delivers the same to the receive section 3. The receive section 3 converts the input NAVTEX broadcast signal into a baseband NAVTEX signal and delivers this NAVTEX signal to the processing section 2. The receive section 3 corresponds to a broadcast signal demodulator mentioned in the appended claims of this invention.

The processing section 2 reconstructs text data from the input NAVTEX signal and extracts latitude/longitude information for each event contained in the text data by a later-described procedure. The processing section 2 also calculates the distance from own ship to an event concerned from information on latitude/longitude of the receiver entered from the GPS receiver 12 and the latitude/longitude information for the event.

Figure 3A:
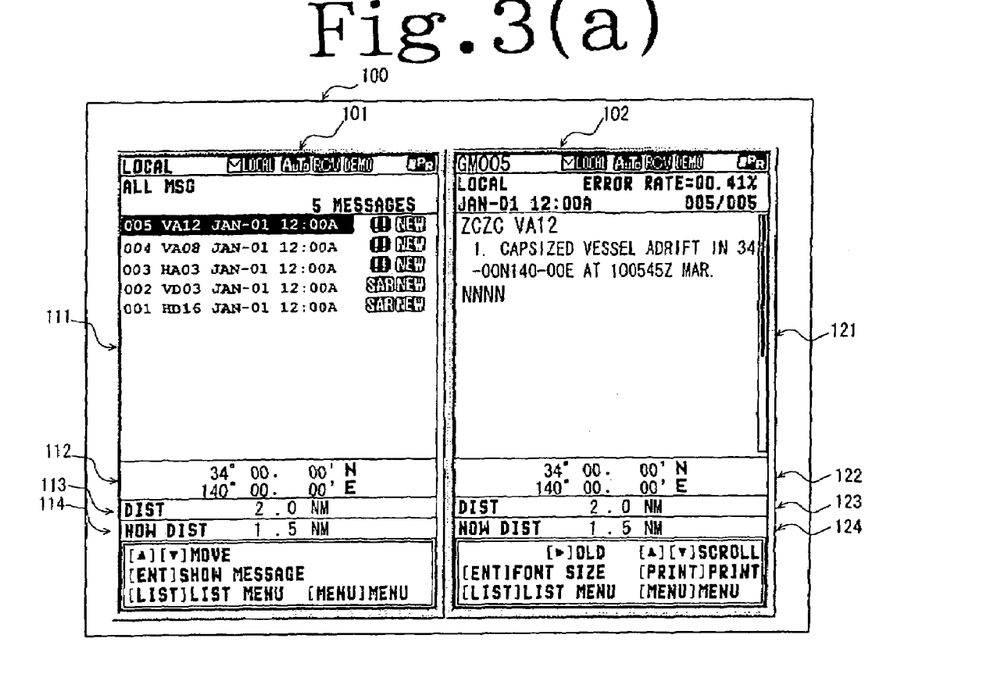
FIGS. 3A and 3B are diagrams showing examples of on-screen display provided by the NAVTEX receiver of FIG. 1.
Figure 3B:
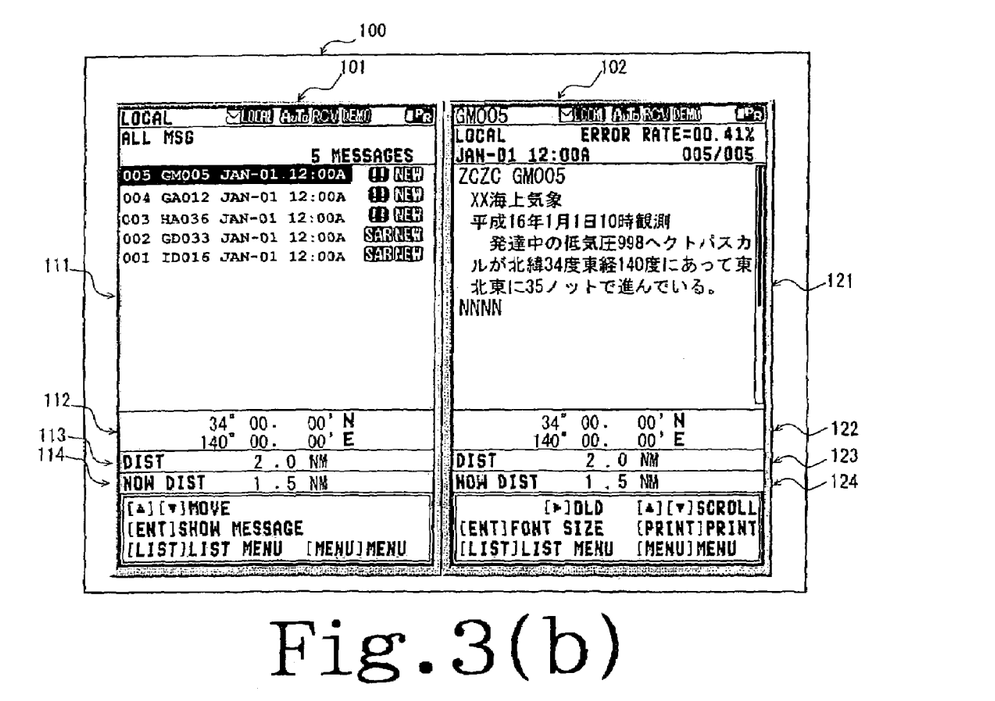

The processing section 2 produces image data by using the reconstructed text data, the latitude/longitude information for the event and own ship and distance information, and outputs the image data to the display section 4 for on-screen display of which examples are shown in FIGS. 3A and 3B.

The processing section 2 includes a central processing unit (CPU) for performing various mathematical operations and a read-only memory (ROM) storing a program used for performing the mathematical operations. The processing section 2 corresponds to an information extractor including a distance calculator and a latitude/longitude information detector which may include a special character string extractor mentioned in the appended claims of this invention.

The display section 4 presents an image as shown in FIG. 3A or 3B based on the image data fed from the processing section 2.

FIGS. 3A and 3B are diagrams showing typical examples of on-screen display provided by the NAVTEX receiver 1 of the present embodiment, in which shown in FIG. 3A is a screen image 100 in English and shown in FIG. 3B is a screen image 100 in Japanese.

Referring to FIGS. 3A and 3B, the screen image 100 presented on the display section 4 of the NAVTEX receiver 1 includes a received message listing area 101 for displaying a list of received NAVTEX messages and a message content display area 102 for displaying the content (text data) of a NAVTEX message selected from the NAVTEX messages (highlighted in FIGS. 3A and 3B) displayed in the received message listing area 101. The screen image 100 can be switched to display only the received message listing area 101 or the message content display area 102 instead of displaying both at the same time.

The received message listing area 101 includes a message list display sub-area 111 for displaying a list of message identification codes of the individual NAVTEX messages received and the times of reception thereof, a latitude/longitude display sub-area 112 for displaying latitude/longitude at which an event contained in the selected NAVTEX message took place, an original distance display sub-area 113 for displaying the distance from own ship to the site of the event of the selected NAVTEX message at the time of reception thereof, and a current distance display sub-area 114 for displaying the distance from own ship to the site of the event of the selected NAVTEX message at the present time.

On the other hand, the message content display area 102 includes a message text display sub-area 121 for displaying the text data content of the selected NAVTEX message, a latitude/longitude display sub-area 122 for displaying latitude/longitude at which the event contained in the selected NAVTEX message took place, an original distance display sub-area 123 for displaying the distance from own ship to the site of the event of the selected NAVTEX message at the time of reception thereof, and a current distance display sub-area 124 for displaying the distance from own ship to the site of the event of the selected NAVTEX message at the present time.

The operations performed by the processing section 2 are now described specifically with reference to FIGS. 2, 3A and 3B.

When the baseband NAVTEX signal is input from the receive section 3, the processing section 2 reconstructs text data from a NAVTEX message received and stores the text data in an unillustrated memory (step S1). Next, the processing section 2 searches for a special character string arranged in accordance with a prescribed format through the reconstructed text data (step S2). Here, the special character string is a formatted character string which will be used as latitude/longitude information, including numerals followed by "N" or "S" and numerals followed by "E" or "W" in the case of an English language NAVTEX message, numerals preceded by a Japanese word meaning north latitude or a Japanese word meaning south latitude and numerals preceded by a Japanese word meaning east longitude or a Japanese word meaning west longitude in this order in the case of a Japanese language NAVTEX message. When such a special character string is found in the text data, the processing section 2 analyzes a sentence (e.g., a series of characters from one carriage return/line feed to the next) containing the special character string and acquires latitude/longitude information (steps S3, S4).

More specifically, in the case of a special character string including numerals followed by "N" and numerals followed by "E" in text data reconstructed from an English language NAVTEX message, for example, it is obvious that the numerals immediately preceding the letter "N" indicate north latitude and the numerals immediately preceding the letter "E" indicate east longitude and, thus, the processing section 2 extracts a portion of the text data containing the character string including the numerals followed by "N" and the numerals followed by "E" as latitude/longitude information. Also, in the case of a special character string including numerals followed by "S" and numerals followed by "W" in text data reconstructed from an English language NAVTEX message, for example, it is obvious that the numerals immediately preceding the letter "S" indicate south latitude and the numerals immediately preceding the letter "W" indicate west longitude and, thus, the processing section 2 extracts a portion of the text data containing the character string including the numerals followed by "S" and the numerals followed by "W" as latitude/longitude information.

On the other hand, it is obvious that a special character string including numerals preceded by the Japanese word meaning north latitude and numerals preceded by the Japanese word meaning east longitude contained in text data reconstructed from a Japanese language NAVTEX message gives north latitude and east longitude information and, thus, the processing section 2 extracts a portion of the text data containing this special character string as latitude/longitude information. Also, it is obvious that a special character string including numerals preceded by the Japanese word meaning south latitude and numerals preceded by the Japanese word meaning west longitude contained in text data reconstructed from a Japanese language NAVTEX message gives north latitude and east longitude information and, thus, the processing section 2 extracts a portion of the text data containing this special character string as latitude/longitude information.

It is to be pointed out in the above connection that different NAVTEX broadcasts, especially those in national languages, may adopt different formats for the special character string. Therefore, the NAVTEX receiver 1 should be set, or programmed, to correctly detect a special character string arranged in a prescribed format and extract the latitude/longitude information from NAVTEX messages received within a particular service area in which own ship is located according to technical characteristics used for NAVTEX broadcasts in the relevant service area.

The aforementioned operations of steps S3 and S4 are explained more particularly with reference to the examples of on-screen display shown in FIGS. 3A and 3B.

In the case of an English language NAVTEX broadcast (FIG. 3A), the processing section 2 detects a special character string including numerals followed by "N" and numerals followed by "E" in a first sentence (paragraph) of text data. Upon detecting this character string, the processing section 2 extracts "34.00 N" and "140.00 E" from the special character string (as illustrated in FIG. 3A), from which the processing section 2 recognizes that the text data contains an event occurring (or which has occurred) at a geographical site of 34 degrees north latitude, 140 degrees east longitude.

An example of a Japanese language NAVTEX broadcast is explained referring to FIG. 3B. The Japanese language NAVTEX message illustrated in FIG. 3B contains a message text in Japanese which states, as translated into English, "XX sea area weather (carriage return/line feed) Observed at 10:00 on Jan. 1, 2004 (carriage return/line feed) A 998 hecto Pascal developing low pressure currently located at 34 degrees north latitude, 140 degrees east longitude is moving east-northeast at 35 knots." First, the processing section 2 detects a special character string including numerals preceded by the Japanese word meaning south latitude and numerals preceded by the Japanese word meaning west longitude in a third sentence (paragraph) of text data. Upon detecting this character string, the processing section 2 extracts "34.00 N" from the expression "34 degrees north latitude" and "140.00 E" from the expression "140 degrees east longitude", from which the processing section 2 recognizes that the text data contains an event occurring (or which has occurred) at a geographical site of 34 degrees north latitude, 140 degrees east longitude.

Next, the processing section 2 calculates the distance and direction from a geographical site indicated by the latitude/longitude information for own ship entered from the GPS receiver 12 to that indicated by the aforementioned latitude/longitude information acquired from the text data. Specifically, the processing section 2 calculates the distance and direction from own ship to the geographical site where the event contained in the text data is occurring (or has occurred). Here, the processing section 2 calculates not only the distance and direction from the location of own ship at a point in time when the NAVTEX receiver 1 has received the pertinent NAVTEX message to the geographical site of the event using the latitude/longitude information for own ship obtained at that point in time but also the distance and direction from the current location of own ship to the geographical site of the event using the latitude/longitude information for own ship obtained at present time (step S5).

If it is needed to display only the distances (and not the directions) from own ship to the event concerned as indicated by "DIST 2.0 NM" and "NOW DIST 1.5 NM" in the examples of FIGS. 3A and 3B, the processing section 2 should calculate the distance from the location of own ship at the point in time when the NAVTEX receiver 1 has received the NAVTEX message to the geographical site of the event and the distance from the current location of own ship to the geographical site of the event. The calculated distance may be as the distance along the arc of a great circle between two geographical sites or the distance along a rhumb line between two geographical sites. Essentially, the processing section 2 is to be optimally set, or programmed, to perform distance calculations according to technical characteristics of the NAVTEX receiver 1.

The latitude/longitude information extracted from the text data and the distances from the location of own ship at the time of NAVTEX message reception and at the present time to the site of the event are subjected to an image-forming process for on-screen character display. Then, the latitude/longitude information is displayed in the latitude/longitude display sub-areas 112, 122, the distance from own ship to the site of the event of the selected NAVTEX message at the time of reception thereof is displayed in the original distance display sub-areas 113, 123, and the distance from own ship to the site of the event of the selected NAVTEX message at the present time is displayed in the current distance display sub-areas 114, 124.

In the examples of FIGS. 3A and 3B, the NAVTEX receiver 1 displays "34.00° N 140.00° E" in the latitude/longitude display sub-areas 112, 122, "2.0 NM" in the original distance display sub-areas 113, 123, and "1.5 NM" in the original distance display sub-areas 113, 123 (step S6), where NM is an acronym for nautical miles. While the examples of FIGS. 3A and 3B show only the distances, the directions of the site of the event from the location of own ship at the time of NAVTEX message reception and at the present time may also be displayed.

Since the NAVTEX receiver 1 of the first embodiment configured as thus far described displays the distances from the location of own ship at the time of NAVTEX message reception and at the present time to the site of the event (the low pressure in the example of FIG. 3B) contained in the NAVTEX message on-screen, a user can instantly recognize the distance from own ship to the geographical site of the event from the screen image 100 and use this information for navigational purposes. Therefore, the user can know the distance from own ship to the site of the event concerned without the need to undertake demanding work of manually calculating the distance as required with conventional NAVTEX receivers. If the direction of the site of the event from own ship is also displayed, the user can maneuver own ship more efficiently by using the distance and direction information.

Second Embodiment

A receiver according to a second embodiment of the invention is now described with reference to FIGS. 4 and 5. The receiver of the second embodiment has the same configuration as but follows a different sequence of information processing operations from that of the first embodiment. Thus, the description of the receiver configuration is not repeated here.

Figure 4:
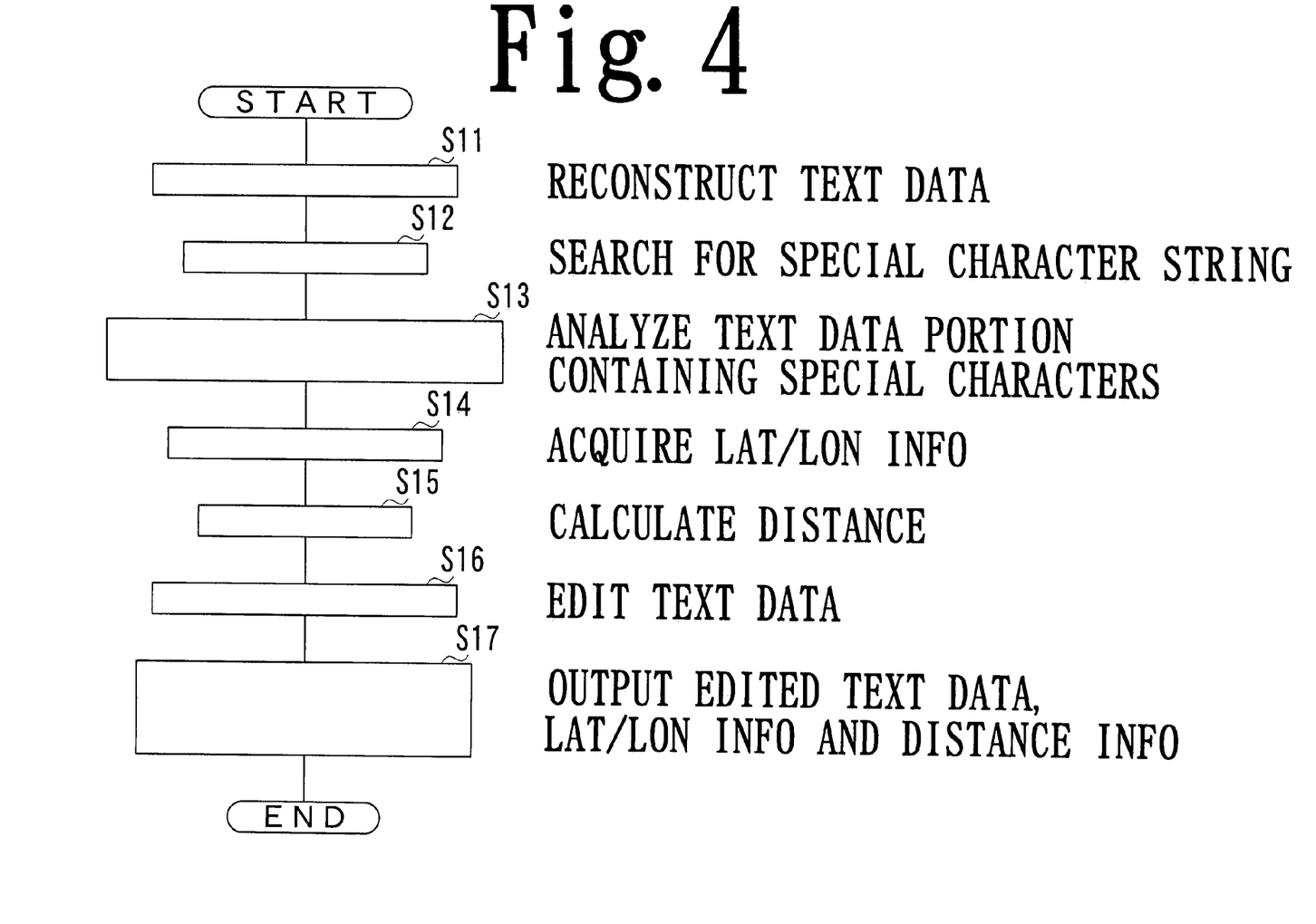
FIG. 4 is a flowchart showing a flow of operations performed by a processing section of a NAVTEX receiver according to a second embodiment of the invention.
Figure 5:
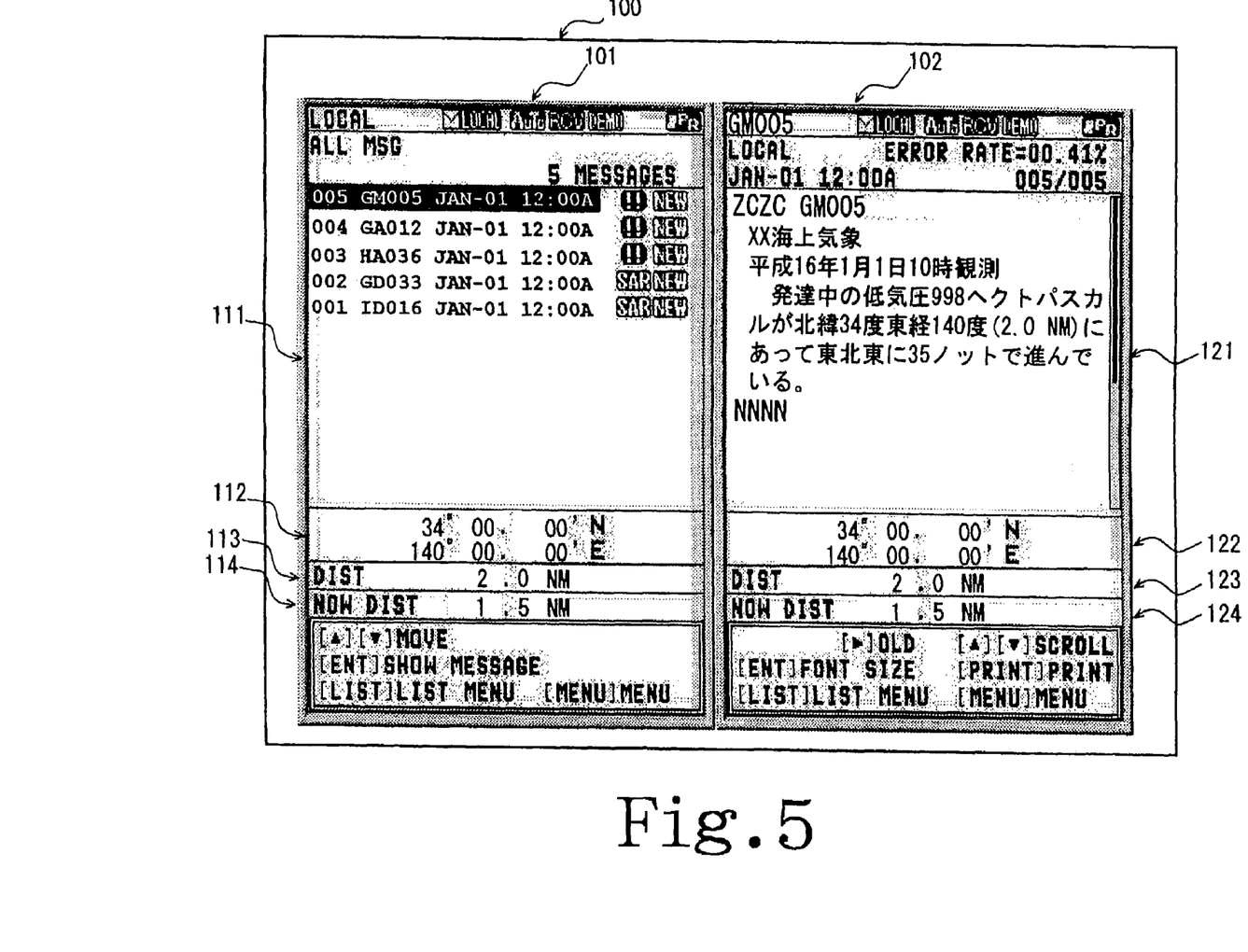
FIG. 5 is a diagram showing an example of on-screen display provided by the NAVTEX receiver of the second embodiment.

FIG. 4 is a flowchart showing a flow of operations performed by a processing section 2 of the receiver (NAVTEX receiver 1) of the second embodiment, and FIG. 5 is a diagram showing an example of a screen image 100 given on a display section 4 of the NAVTEX receiver 1. The content of this example of the screen image 100 is essentially the same as shown in FIG. 3B.

In the flowchart of FIG. 4, processing operations from the beginning to distance calculation (steps S11 to S15) are the same as the aforementioned operations of S1 to S5 of the first embodiment and, thus, the description of these steps is not repeated. Given below is an explanation of steps that follow step S15.

After the text data is reconstructed from a received NAVTEX message and information on the distance from own ship to the geographical site of an event concerned is obtained by analyzing latitude/longitude information acquired from the text data, the processing section 2 converts the distance information into a text data format and edits the reconstructed text data (step S16). More specifically, the processing section 2 inserts the distance information converted into the text data format immediately at the end of the latitude/longitude information contained in the reconstructed text data. Then, the processing section 2 produces image data by using the text data thus edited, the latitude/longitude information and the distance information, and outputs the image data to the display section 4 (step S17).

As a result of the above-described processing operations, the display section 4 presents the screen image 100 as shown in FIG. 5. Compared to the screen image 100 of FIG. 3B given by the NAVTEX receiver 1 of the first embodiment, the screen image 100 of FIG. 5 given by the NAVTEX receiver 1 of the second embodiment presents in a message text display sub-area 121 thereof an edited message text in Japanese, for example, which reads, as translated into English, "XX sea area weather (carriage return/line feed) Observed at 10:00 on Jan. 1, 2004 (carriage return/line feed) A 998 hecto Pascal developing low pressure currently located at 34 degrees north latitude, 140 degrees east longitude (2.0 NM) is moving east-northeast at 35 knots." As shown in the example of FIG. 5, the NAVTEX receiver 1 displays the distance information immediately at the end of the latitude/longitude information in the message text display sub-area 121 by performing the above-described processing operations of the present embodiment.

Since the NAVTEX receiver 1 of the second embodiment is configured as described above, the user can recognize both the latitude/longitude information and the distance information about the event contained in a selected NAVTEX message by just looking at the message text display sub-area 121. Furthermore, even if there exists more than one set of latitude/longitude information in a single message text as will be later discussed, the user can read the latitude/longitude information and the distance information for all events contained in the single message text at the same time.

Third Embodiment

Figure 6:
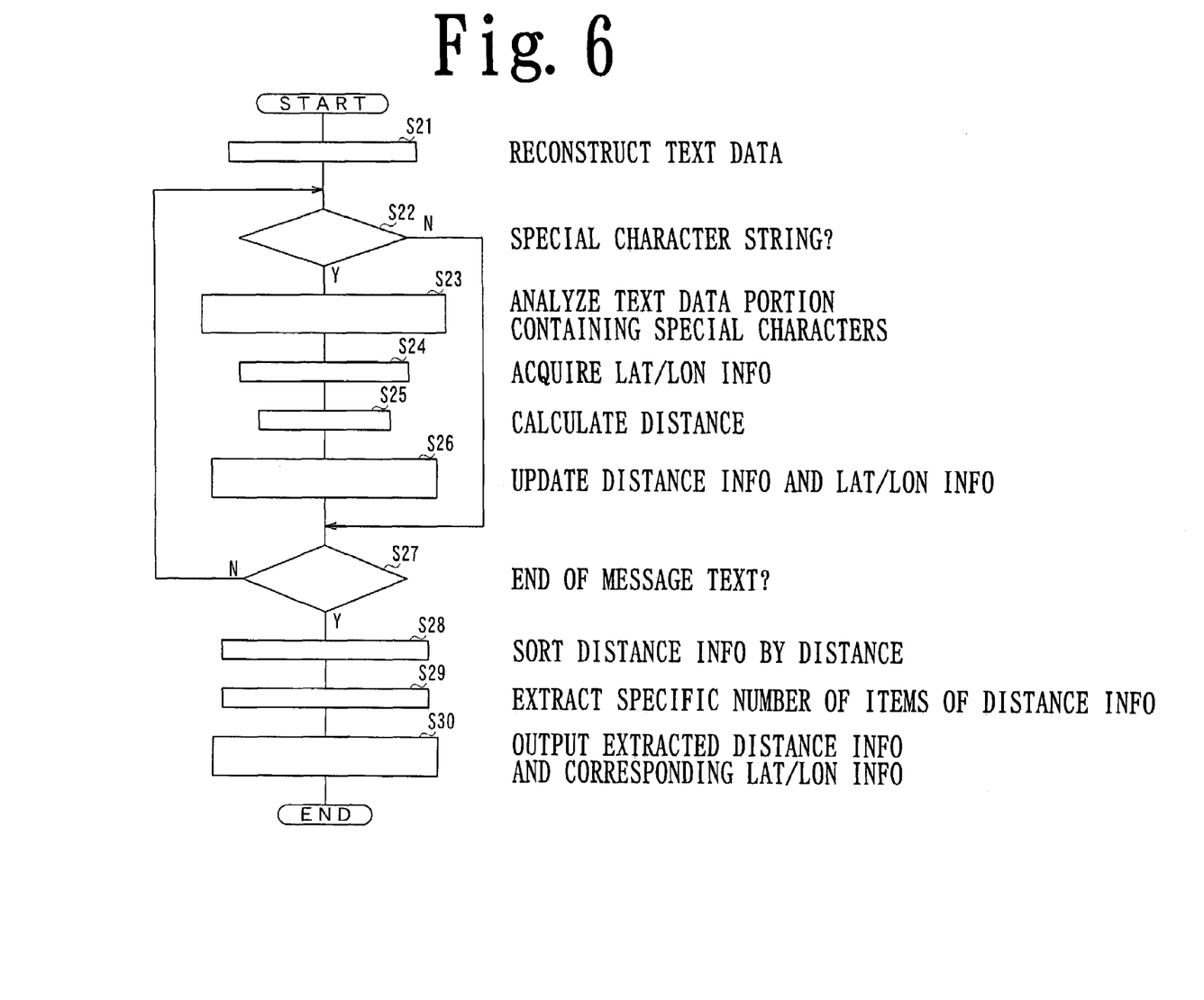
FIG. 6 is a flowchart showing a flow of operations performed by a processing section of a NAVTEX receiver according to a third embodiment of the invention.

A receiver according to a third embodiment of the invention is now described with reference to FIG. 6 which is a flowchart showing a flow of operations performed by a processing section 2 of the receiver (NAVTEX receiver 1) of the third embodiment including, in particular, processing operations for displaying a NAVTEX message containing a plurality of events and latitude/longitude information thereof.

While the invention has been described with reference to the examples of the first and second embodiments in which the NAVTEX message contains one event only, a single NAVTEX message broadcast from a NAVTEX station may contain more than one event and latitude/longitude information thereof. For example, a NAVTEX message may contain information on multiple low pressures. The third embodiment of the invention discussed below is concerned with a sequence of operations performed by the processing section 2 in dealing with this kind of NAVTEX message. The receiver of the third embodiment has the same configuration as that of the first and second embodiments, so that the description of the receiver configuration is not repeated here.

As in the first and second embodiments, the processing section 2 reconstructs text data from a NAVTEX message received (step S21). Next, the processing section 2 searches for a special character string contained in the reconstructed text data from the beginning thereof, and when a sentence (paragraph) containing a special character string is found, the processing section 2 analyzes this sentence and acquires latitude/longitude information (steps S22, S23, S24).

Then, the processing section 2 calculates the distance from a geographical site indicated by latitude/longitude information for own ship entered from the GPS receiver 12 to that indicated by the aforementioned latitude/longitude information acquired from the text data (step S25), and stores the acquired latitude/longitude information and distance information corresponding thereto in the unillustrated memory (step S26). The processing section 2 reexecutes the aforementioned operations of steps S22 to S26 each time a special character string is found until the end of the text data is detected (step S27).

When no more special character string is found in the text data and the end of the text data is detected (Yes in step S27), the processing section 2 sorts multiple items of distance information stored in the memory (step S28) and extracts a preset number of items of distance information (step S29). For example, the processing section 2 sorts the multiple items of distance information in order of increasing distance from own ship to individual events and extracts a specified number of items of distance information. To give a more specific example, the processing section 2 sorts the multiple items of distance information in order of increasing distance from own ship to individual events and extracts only one item of distance information indicating the shortest distance among all the items.

Then, the processing section 2 the converts the extracted distance information and the latitude/longitude information corresponding thereto into image data and outputs the image data to the display section 4 (step S30). If the NAVTEX receiver 1 is set, or programmed, to display only one item of distance information indicating the shortest distance, for example, the processing section 2 outputs the image data containing the distance information for only the shortest distance (nearest event) and the corresponding latitude/longitude information. If the NAVTEX receiver 1 is set, or programmed, to display items of distance information for three shortest distances, for example, the processing section 2 outputs the image data containing the distance information for three shortest distances (three nearest events) and the corresponding latitude/longitude information.

With this arrangement, the user can easily recognize the specified number of items of distance information when a NAVTEX message contains multiple events and corresponding latitude/longitude information. For example, the user can instantly recognize with ease the distances from own ship to events occurring at geographical sites nearest own ship that often require relative urgency so that the user can the distance information for navigational purposes.

In one form of the third embodiment, the processing section 2 may output event information together with the distance information and the latitude/longitude information.

A Japanese language NAVTEX message like the one shown in FIG. 5, for example, includes a 5-character technical code in a preamble of the message, of which second character is a subject indicator character used for identifying different classes of messages. The processing section 2 detects and use this second character to determine the nature of the event information included in each NAVTEX message received and to estimate words which may appear in textual content of the event information. In the example of FIG. 5, the technical code which appears in the preamble is "GM005" so that the processing section 2 recognizes that the message contains meteorological information as indicated by the second character "M" (which is used in Japanese language NAVTEX broadcasts). Accordingly, the processing section 2 employs such a word as "low pressure" as indicating the event information, for example. Upon extracting such the event information, the processing section 2 converts the event information, the latitude/longitude information and the distance information into image data and outputs the image data to the display section 4.

In the case of an English language NAVTEX message, the processing section 2 determines the nature of event information contained in the message from a second character of a 4-character technical code which appears in a preamble of the message. A screen image 100 presented on the display section 4 contains information on one or more events occurring (or which have occurred) at one or more geographical sites nearest own ship as well as latitude/longitude information and distance information for each geographical site. The user can easily recognize the distances from own ship to a specific number of events nearest own ship contained in the NAVTEX message received.

While the third embodiment has been described with reference to the examples in which one NAVTEX message contains information on a plurality of events, the aforementioned sequence of operations of the third embodiment is applicable to a case where a plurality of NAVTEX messages are received in succession or almost at the same time, yet producing the same advantageous effects as described above.

Fourth Embodiment

A receiver according to a fourth embodiment of the invention is now described with reference to FIG. 7 which is a flowchart showing a flow of operations performed by a processing section 2 of the receiver (NAVTEX receiver 1) of the fourth embodiment including, in particular, processing operations for displaying a NAVTEX message containing a plurality of events and latitude/longitude information thereof.

The fourth embodiment of the invention discussed below is concerned with a sequence of operations performed by the processing section 2 in dealing with a NAVTEX message containing a plurality of events of different kinds. A NAVTEX message containing information on a plurality of low pressures and fronts is an example of this kind of NAVTEX message.

Figure 7:
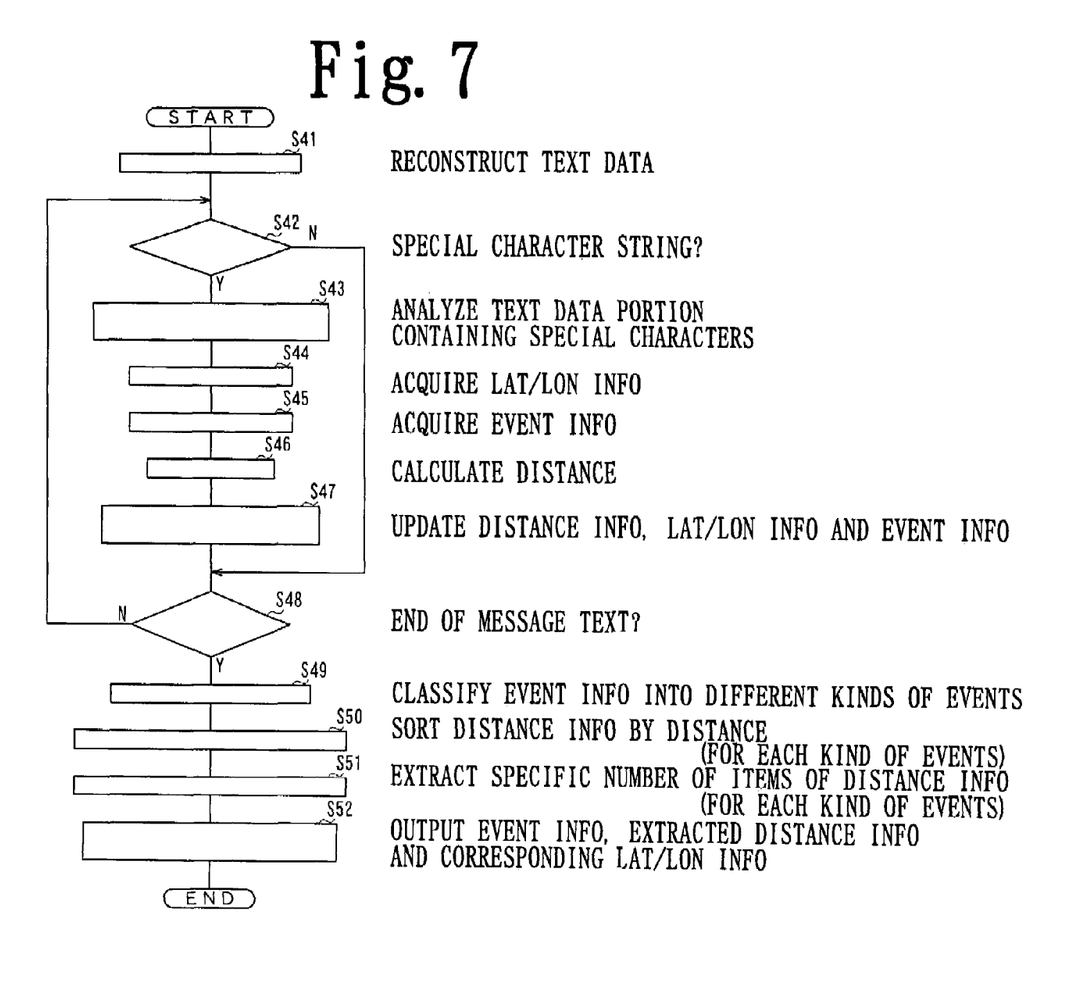
FIG. 7 is a flowchart showing a flow of operations performed by a processing section of a NAVTEX receiver according to a fourth embodiment of the invention.

In the flowchart of FIG. 7, processing operations from the beginning to acquisition of latitude/longitude information (steps S41 to S44) are the same as the aforementioned operations of S21 to S24 of the third embodiment and, thus, the description of these steps is not repeated.

Upon acquiring the latitude/longitude information for a particular event, the processing section 2 searches for a special character string representing event information from within text data of a sentence (paragraph) containing latitude/longitude information, and when a sentence (paragraph) containing event information is found, the processing section 2 analyzes this sentence and acquires the event information (step S45). Then, the processing section 2 calculates the distance from a geographical site indicated by latitude/longitude information for own ship entered from the GPS receiver 12 to that of the event indicated by the aforementioned latitude/longitude information acquired for the event (step S46).

The processing section 2 stores the acquired event information and the latitude/longitude information together with distance information corresponding thereto in the unillustrated memory (step S47). The processing section 2 reexecutes the aforementioned operations of steps S42 to S47 each time a special character string is found until the end of the text data is detected (step S48).

When no more special character string is found in the text data and the end of the text data is detected (Yes in step S48), the processing section 2 classifies multiple items of stored event information associated with the latitude/longitude information and the distance information corresponding thereto into different kinds of events (step S49). Subsequently, the processing section 2 sorts multiple items of distance information stored in the memory for each kind of events (step S50) and extracts a preset number of items of distance information (step S51). For example, the processing section 2 sorts the multiple items of distance information in order of increasing distance from own ship to individual events and extracts a specified number of items of distance information for each kind of events.

Then, the processing section 2 the converts the extracted distance information and the latitude/longitude information corresponding thereto together with the event information into image data and outputs the image data to the display section 4 (step S52). If the NAVTEX receiver 1 is set, or programmed, to display only one item of distance information indicating the shortest distance for a specific kind of events, for example, the processing section 2 outputs the image data containing the distance information for only the shortest distance (nearest event) and the corresponding latitude/longitude information together with the event information.

With this arrangement, the user can easily recognize the specified number of items of distance information concerning multiple events occurring at geographical sites nearest own ship for each kind of events that may require relative urgency.

While the fourth embodiment has been described with reference to an example in which a single NAVTEX message contains information on different kinds of events, the aforementioned sequence of operations of the fourth embodiment is applicable to a case where a plurality of NAVTEX messages are received in succession or almost at the same time, yet producing the same advantageous effects as described above.

In a case where the processing section 2 acquires multiple items of distance information from a plurality of NAVTEX messages and outputs distance information on events nearest own ship extracted from the NAVTEX messages to the display section 4, the NAVTEX receiver 1 may be configured to allow the user to distinguish a NAVTEX message containing an event of which geographical site is the nearest. To achieve this, the NAVTEX message containing an event occurring at a geographical site nearest own ship may be marked by a specific symbol or highlighted in the received message listing area 101 of the screen image 100 shown in FIGS. 3A and 3B, for example. This arrangement enables the user to easily recognize the NAVTEX message containing an event occurring at a geographical site nearest own ship. This arrangement can also be used when multiple items of distance information are displayed on-screen.

While the invention has thus far been described with reference to the preferred embodiments thereof in which the latitude/longitude information for an event extracted from the text data of a received NAVTEX message is displayed in the latitude/longitude display sub-areas 112, 122, the embodiments may be modified to display latitude/longitude information for own ship or latitude/longitude information for both the event and own ship. Also, in a case where the text data contains latitude/longitude information for multiple events, the NAVTEX receiver 1 may simultaneously display the latitude/longitude information extracted for more than one event.

Furthermore, although the NAVTEX receiver 1 of the foregoing embodiments displays the distance from own ship to the site of one event contained in a selected NAVTEX message at the time of reception thereof and the distance from own ship to the site of the same event at the present time in the current distance display sub-areas 114, 124, respectively, the NAVTEX receiver 1 may be modified to simultaneously display the distances from own ship to the sites of multiple events.

Moreover, although the invention has thus far been described as being implemented in the NAVTEX receiver 1, the aforementioned configuration of the invention can be applied to any kind of apparatuses which receive broadcasts containing information on a particular event or latitude/longitude, for instance, in a passive way.

What is claimed is:

1. A receiver comprising:
   a broadcast signal demodulator for receiving and demodulating a navigational telex (NAVTEX) broadcast signal;
   an information extractor for extracting marine-related information from the demodulated broadcast signal;
   an image former for forming an image indicating the extracted marine-related information;
   a latitude and longitude information detector for detecting latitude and longitude information contained in said marine-related information; and
   a calculator for calculating a distance between the location of the receiver and the detected latitude and longitude information;
   wherein said information extractor selects from the calculated distances only those distances that satisfy predetermined conditions and outputs the selected distances and the latitude and longitude information corresponding thereto to said image former.

2. The receiver according to claim 1, wherein said latitude/longitude information detector includes a special character string extractor for extracting a special character string indicating latitude and longitude from said marine-related information.

3. The receiver according to claim 2, wherein said special character string extractor searches for a character string including numerals followed by "N" or "S" and numerals followed by "E" or "W" in this order contained in said marine-related information and extracts the character string thus formatted as said latitude and longitude information.

4. The receiver according to claim 1, wherein said information extractor extracts event information corresponding to each distance satisfying said predetermined conditions and outputs the event information to said image former.

5. The receiver according to claim 1, 2, or 3, wherein said information extractor extracts event information for individual items of detected latitude and longitude information, classifies multiple items of extracted event information into different kinds of event information, selects from distances calculated by using multiple items of detected latitude and longitude information only such distances that satisfy predetermined conditions for each kind of classified event information, and outputs the selected distances and the event information to said image former.

* * * * *